(12) United States Patent
Gruber et al.

(10) Patent No.: US 6,413,465 B1
(45) Date of Patent: Jul. 2, 2002

(54) APPARATUS TO ACTUATE INJECTION ELEMENT

(75) Inventors: Reinhard Gruber, Neudorfl (DE); Harald Bleier, Wiener Neustadt (AT); Martin Ganz, Katzelsdorf (CH)

(73) Assignee: Battenfeld GmbH, Meinerzhagen (DE)

( * ) Notice: Subject to any disclaimer, the term of this patent is extended or adjusted under 35 U.S.C. 154(b) by 0 days.

(21) Appl. No.: 09/291,398

(22) Filed: Apr. 14, 1999

(30) Foreign Application Priority Data

May 4, 1998 (DE) .......................... 198 19 759

(51) Int. Cl.⁷ .............................................. B29C 45/02
(52) U.S. Cl. ................. 264/328.4; 264/328.5; 264/238.9; 425/557; 425/561
(58) Field of Search ................. 425/557, 558, 425/559, 560, 561, 562, 563, 564, 565, 566, DIG. 5; 264/328.9, 328.4, 328.5

(56) References Cited

U.S. PATENT DOCUMENTS 4,315,726 A * 2/1982 Semerdjiev et al. ........ 425/560
4,449,915 A * 5/1984 van den Brink ............ 425/564
5,925,295 A * 7/1999 Nakamura et al. ......... 264/40.1

FOREIGN PATENT DOCUMENTS

JP          4-122618 A      4/1992     ........... B29C/45/50

* cited by examiner

Primary Examiner—Robert Davis
Assistant Examiner—Emmanuel Luk
(74) Attorney, Agent, or Firm—Hamilton, Brook, Smith & Reynolds, P.C.

(57) ABSTRACT

An apparatus to actuate an injection element (1) for injecting a defined quantity of plasticized plastic or the like into an injection molding tool. The injection element (1) is designed as a piston or as a screw and is guided in a guide (2) and moved by an actuation element. The actuation element (3) has a tappet (4), which is guided on a crank plate (5), the crank plate (5) being turned with positional accuracy by a controlled or regulated servomotor (6). The invention provides that, for the return stroke of the injection element (1), a second tappet (7) is present, which is actuated by a second crank plate (8).

13 Claims, 5 Drawing Sheets

APPARATUS TO ACTUATE INJECTION ELEMENT

BACKGROUND OF THE INVENTION

Conventional injection systems operate either through spindle systems or through hydraulic drives. Known injection molding apparatuses for this purpose typically have a hydraulic piston-cylinder system in axial connection with a plasticizer screw. The piston-cylinder system is used to drive the plasticizer screw forward. As a result, plastic melt or the like is injected into an injection molding tool.

Electrically-driven systems, for example, have spindles that are connected to servomotors. The spindles are moved axially through the motion of the servomotors. Their motion is transferred to an injection screw. The motion of the injection screw can thus be controlled precisely, thereby allowing precise regulation of the injected volume of melt.

Recently, the demand for dimensionally small injection-molded parts has increased. Common examples of such parts include micro-mechanical components (e.g., micro gear wheels for watches), medical-technical hardware, and optoelectronic elements (e.g., parts for optical waveguides).

SUMMARY OF THE INVENTION

One of problem that arises in connection with the production of these small parts is that the injection screw must execute very small and precisely-controlled displacements, in order to inject the desired quantity of melt into the mold. This motion must take place in a very short time. Otherwise there is a risk that the small quantity of plasticized melt will "freeze."

The inherent dynamics of hydraulic drives and also of servodrives does not make it possible to achieve the necessary precision of the injection motion of the male mold in the short time that is available.

The present invention is directed to an apparatus to actuate an injection element and a male mold, by which it is possible to execute very small and reproducible displacements in a very short time. Further, the apparatus is able to approach the switchover point from the injection process to the holding-pressure process, and thus to initiate the holding pressure phase in high dynamics with time and path precision. That is, the switchover point is reached precisely, without any "overshoot" of the injection element.

In general, according to one aspect, the invention features an actuation element that has a tappet, which is guided on a crank plate. The crank plate is turned with positional accuracy by a controlled or regulated servomotor.

In specific embodiments, for the return stroke of the injection element, a second tappet is present, which is actuated by a second crank plate. As an alternative, for the return stroke of the injection element, a contour is milled into the crank plate, within which the tappet is subject to restricted guidance.

The design given here makes it possible for an injection element to achieve an exactly predetermined stroke reproducibly in a very short time and arbitrarily often.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
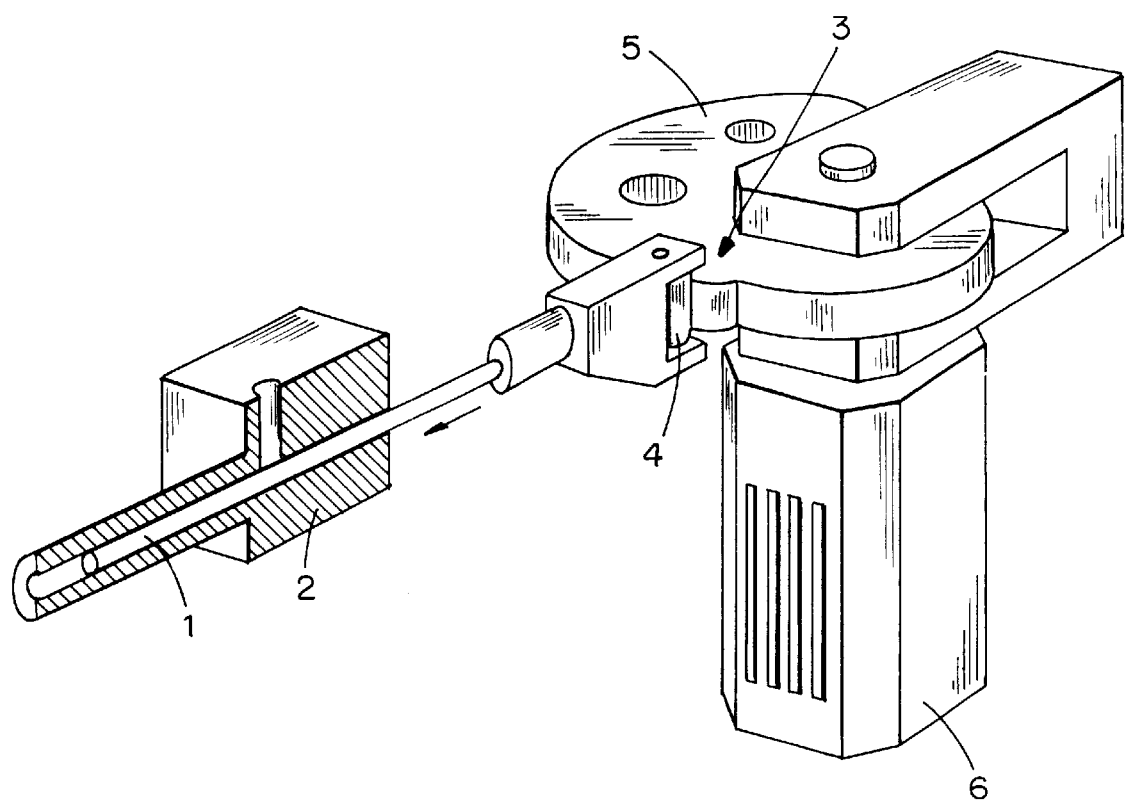
FIG. 1 shows a schematic view, in perspective, of the apparatus for actuating the injection element, according to the present invention.

FIG. 1 shows the apparatus for actuating the injection element 1, which has been constructed according to the principles of the present invention. The injection element 1 is guided in a guide 2, so that the element 1 and the guide 2 represent a piston-cylinder arrangement, which is used to inject plasticized melt into a mold.

The point now is to accomplish the forward feed motion (in the direction of the arrow) both precisely and in a very short time, but also with the necessary force. An actuation element 3 is present for this purpose, which comprises a tappet 4, in contact with a crank plate 5. When the crank plate is turned, it exerts a force on the tappet 4, due to the crank plate's curved shape or camming surface, so that the injection element 1 is moved. The crank plate 5 is turned by means of the servomotor 6.

Figure 2:
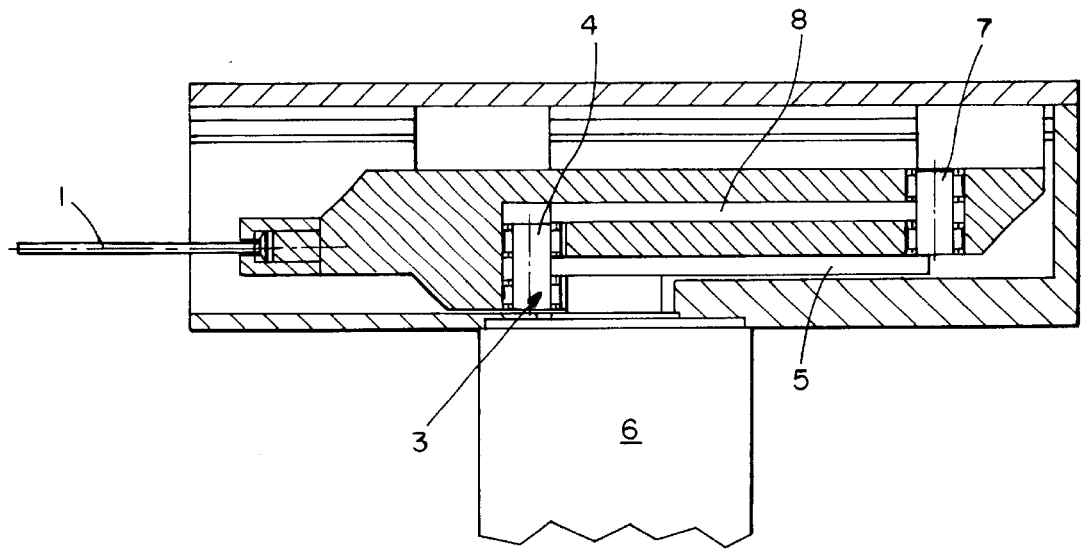
FIG. 2 schematically shows a side view of the inventive apparatus.

Essentially the same structure can be seen in FIG. 2. However, as a supplement, another, second crank plate 8 is present here, which is likewise turned synchronously by the motor 6. The injection element 1 is forcibly entrained through a second tappet 7, when it is again supposed to be pulled back into its starting position—at the end of an injection molding cycle.

As an alternative—but this case is not shown—the tappet 4 can also be constrained to move along a contour, which is milled into the crank plate 5. This obviates a second crank to bring back or reset the element 1.

Figure 3:
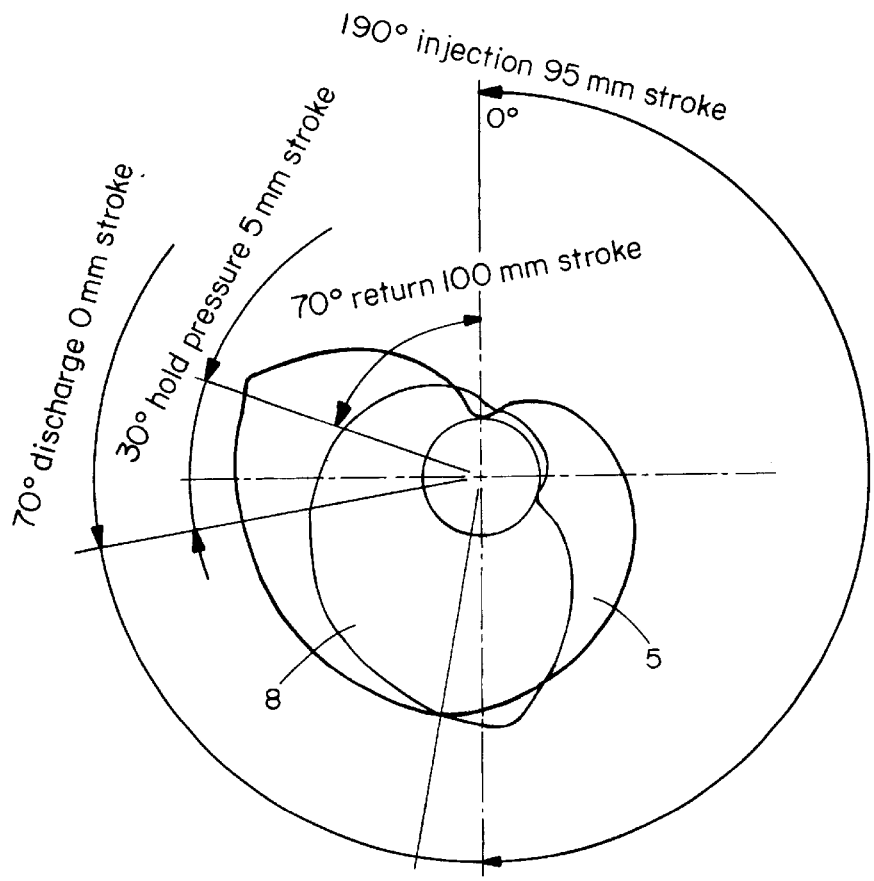
FIG. 3 shows a top view of the crank plate.

FIG. 3 shows, by way of example, how the contour of the crank plate 5 is shaped so as to achieve the inventive goal efficiently. The starting point of the injection molding cycle is the marked null position of the crank plate 5. It is turned in the course of an injection molding cycle by 360°, so that it again returns to its initial position.

In the design shown here, the injection motion takes place through a first rotation angle of 190°. It can be seen that the crank plate 5 in this region is shaped so that the injection element 1 is quickly raised over the tappet 4 (not shown in FIG. 3). In the case shown here, this is a stroke of 95 mm, which is achieved after 190°. A discharge region follows over an angular range of 70°; no further stroke is created here. Another stroke of 5 mm is then created over the next 30° rotation of the plate 5. This creates a hold pressure on the melt. In the last rotation angle of 70°, the injection element is brought back a total of 100 mm. Accordingly, after one rotation of the crank plate 5, the injection element is again positioned in its initial situation.

FIG. 3 likewise shows the corresponding contour of the second crank plate 8 for returning the injection element.

The crank plate 5 here is turned precisely and through an accurate angle by means of the servomotor. The motor 6 is provided with appropriate control data, so that the individual angles explained above are traversed in arbitrarily different times—corresponding to the programming of the motor control.

Preferably, after the hold pressure process, the stroke briefly increases again—by means of an appropriate contour in the crank plate 5. Thus, a sprue which has solidified in the meantime, possibly together with the molded part itself, is ejected from the mold (after the mold opens).

Also, the crank plate 5 need not necessarily always have the same direction of rotation. It can also be arranged that the crank plate 5 is turned backward after the end of the cycle. In connection with a self-blockage at the end of the crank path, this may be interesting or necessary.

An injection piston has been discussed above in connection with the embodiment. In exactly the same way, it is also possible—by using the inventive idea—to control the axial motion of an injection screw during the injection process, the screw here acting like a piston during the injection process, as is well known.

It is therefore a basic idea of the present invention that the contour of the crank plate is chosen so that the changes in dynamic speed, which are needed to inject plasticized plastic or the like, take place more quickly than would be possible with servodrives, on account of their inertia.

In the preferred implementation, the injection unit is used in an apparatus for injecting plastic material described in Patent Application entitled "Method and Apparatus for Injecting Plastic Material," filed on a common date, by Ganz, et al., and assigned Application No. 09/292,040, which is incorporated herein in its entirety by this reference.

Figure 4:
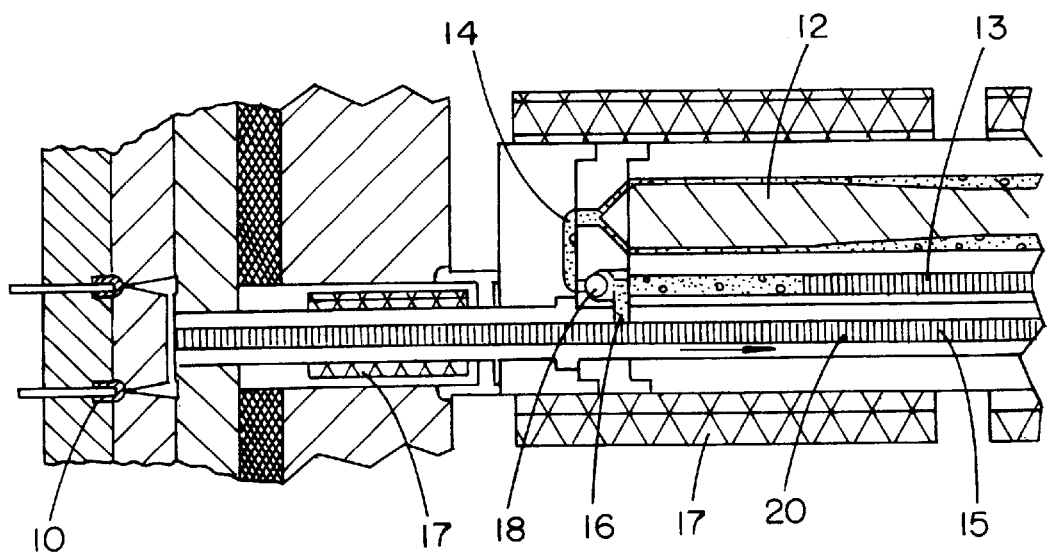
FIG. 4 schematically shows a cross-section of a plasticizing and injection apparatus for plastic or other injectable material, in a first stage of the process, according to the invention.

FIG. 4 shows an injection molding apparatus, which has been constructed according to the principles of the present invention, in its first process stage.

An injection molding tool 10 has a cavity, into which melted plastic is to be injected, so as to produce a molded part. For this purpose, plastic granulate or powder is melted in a screw-plasticizer unit 12, in well-known fashion. The plastic melt passes through a line 14 (a first fluidic connection) into a metering apparatus 13. The metering apparatus 13 essentially comprises a piston-cylinder unit, into which that quantity of plastic melt is introduced. The quantity of the melt is controlled as precisely as possible, to be that which is needed to produce a molded part.

In one implementation, the apparatus is designed so that the motion of the piston of the metering apparatus 13 is detected such as by an encoder and supplied to a machine controller, and the plasticizing process in the plasticizer unit 12 is interrupted by the controller as soon as the piston has reached the desired position (taking into account the temperature and pressure); the precise and required quantity of melt is then in the metering unit 13. In every case, it is important that, before initiating further steps, a precisely defined quantity of melt has been taken in by the metering apparatus.

During the metering process, i.e., while the melt is introduced into the metering apparatus 13, the injection piston 20 of an injection apparatus is in such an advanced position that no melt flows through the line (a second fluidic connection) 16 from the metering apparatus 13 into the injection apparatus 15.

Figure 5:
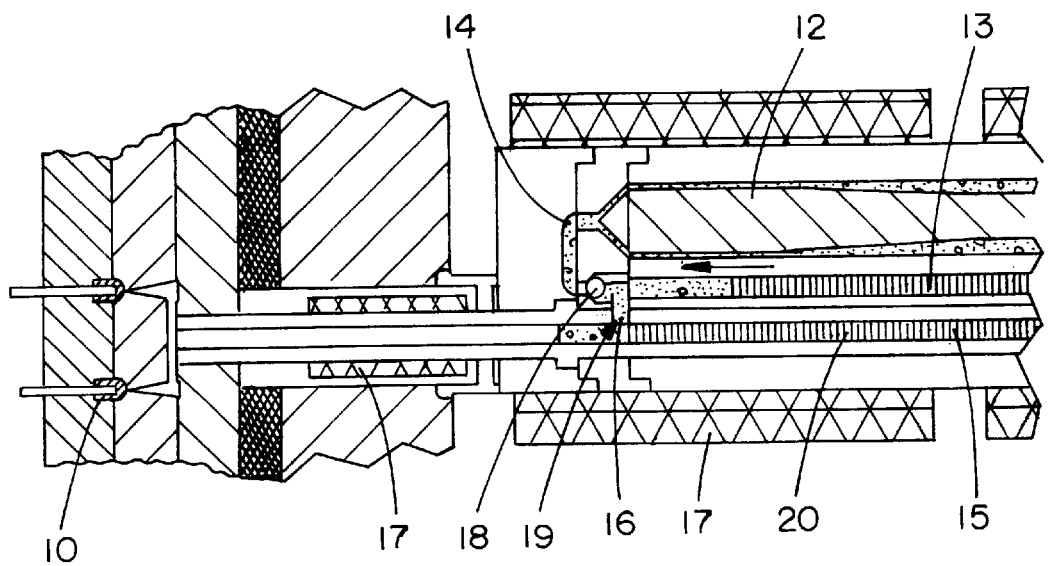
FIG. 5 shows the same structure at a later time.

FIG. 5 shows the next stage of the process. Now, the injection piston 20, which injects the melt into the mold 10, is pulled-back by the controller (see also the arrow in FIG. 4), so that the second fluidic connection 16 between the metering apparatus 13 and the injection apparatus 15 is enabled or established: This allows melt to flow from the metering apparatus 13 into the injection apparatus 15.

Backflow of the melt from the metering apparatus 13 into the plasticizing apparatus 12 is prevented by a non-return valve 18 in the first fluidic connection 14 between the plasticizer apparatus 12 and the metering apparatus 13.

Since the precise quantity of melt has been stored in the metering apparatus 13 that is required to produce the molded part, activation of the piston of the metering apparatus 13 (see arrow in FIG. 5) causes exactly this quantity to be expelled, through the line 16, into the cylinder of the injection apparatus 15.

Figure 6:
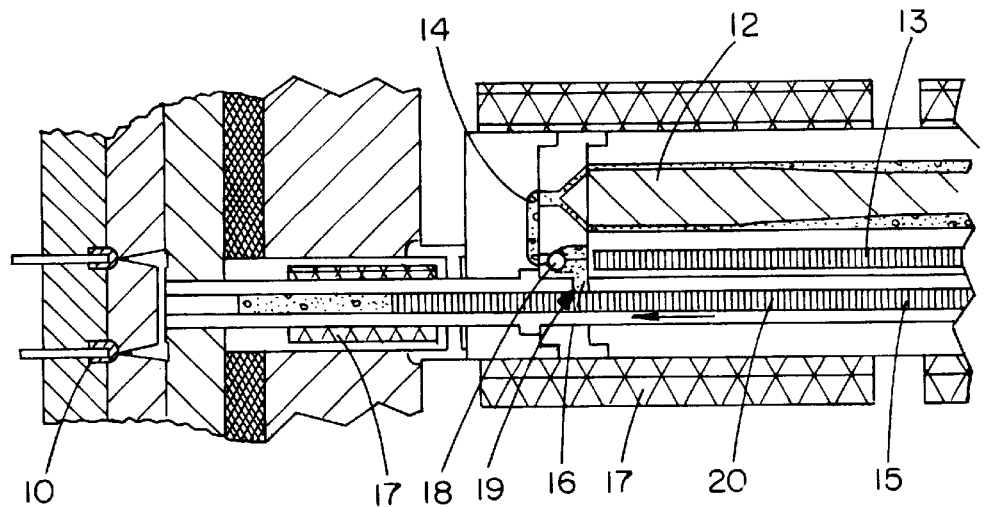
FIG. 6 shows the structure at a still later time.

FIG. 6 shows a later stage of the process. The quantity of melt stored in the metering apparatus 13 has been completely expelled into the injection apparatus 15. Consequently, the piston of the metering apparatus 13 is now in its foremost position. The melt situated in the injection apparatus 15, which preferably corresponds exactly to the quantity which is needed to produce a molded part, is then injected into the mold 10 by the injection piston 20 of the injection apparatus 15 (see arrow in FIG. 6).

The geometric arrangement of the injection apparatus 15 and especially of its piston 20 achieves the result that, when the melt is expelled from the injection apparatus 15 into the mold cavity, the melt is prevented from flowing back into the metering apparatus. After the connection 16 has been passed, the piston actually blocks this connection and then forms the means 19 to prevent the melt from flowing back in the preferred embodiment. Other techniques or systems, however, may be used for this purpose such as controlling the relative pressures or non-return valves.

Figure 7:
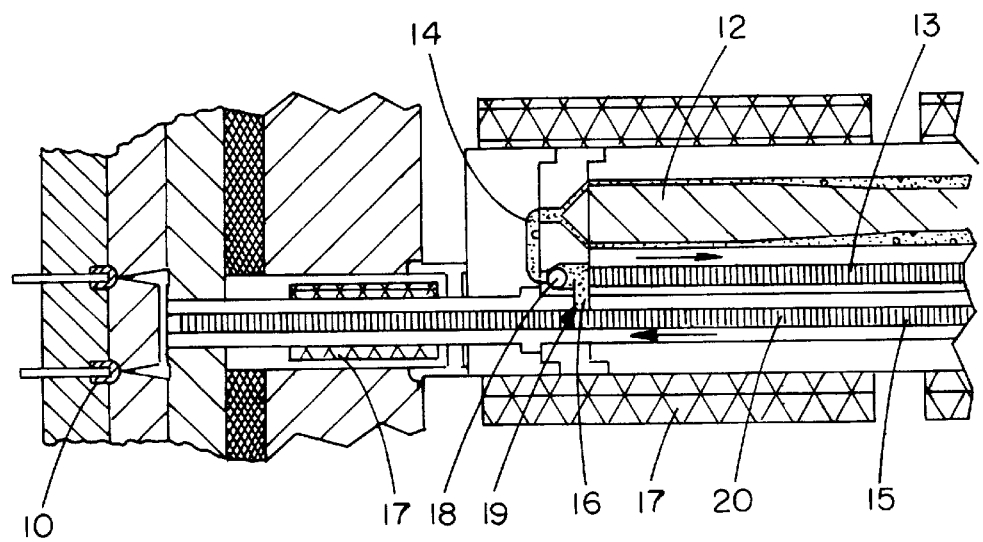
FIG. 7 shows the structure at a still later time.

As FIG. 7 shows, the piston 20 of the injection apparatus 15 is pushed forward so far that it expels all the plastic material situated in the injection apparatus 15. As further shown, preparation of the next shot is already begun: The plasticizing apparatus 12 is already again producing plastic melt, which is expelled into the metering apparatus 13 (see arrow above the metering apparatus 13).

As can further be seen in all the figures, heating elements or temperature-stabilizing devices 17 are present, which surround at least parts of the apparatus, to ensure that the melt cannot "freeze" in the apparatus or in its parts.

Figure 8:
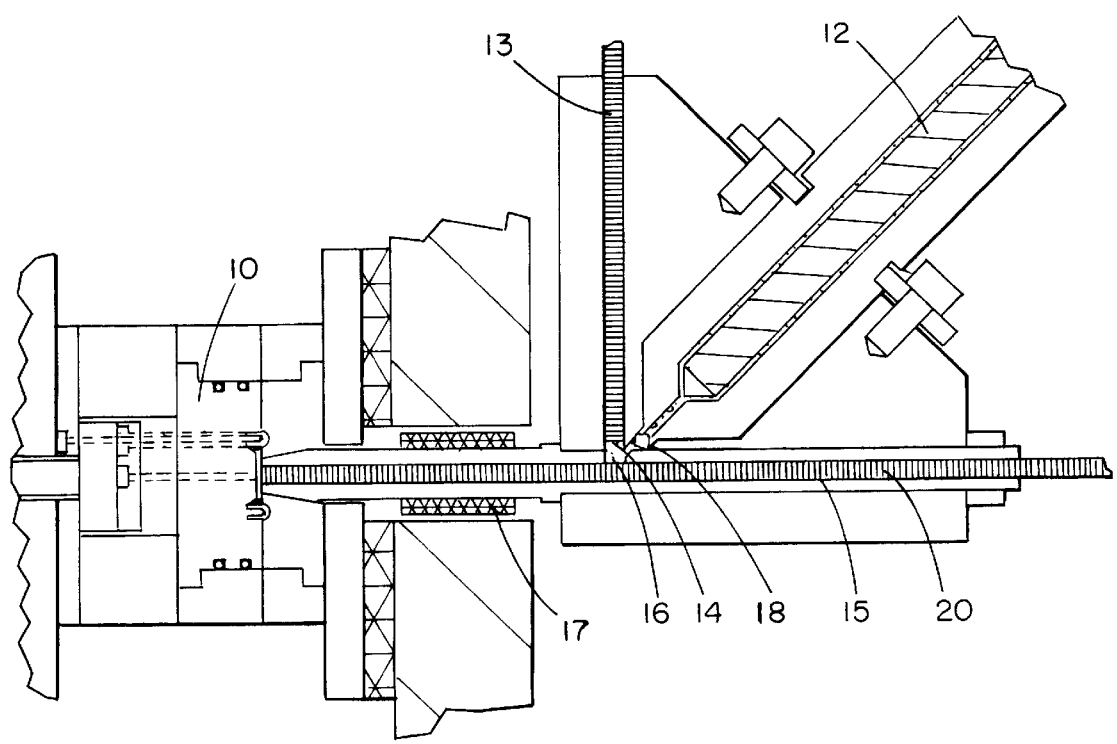
FIG. 8 shows an alternative design of the plasticizing and injection apparatus.

FIG. 8 shows another embodiment of the apparatus. In principle, this apparatus operates precisely like the one shown in FIGS. 4 to 7. However, as can be observed, the plasticizing apparatus 12, the metering apparatus 13, and the injection apparatus 15 are disposed at an angle to one another, and specifically in such a way that the three units 12, 13, and 15 work toward a common intersection point, which is situated at the point where the longitudinal axes of the three units meet.

For demolding the finished injection-molded parts from the mold or from the gate, the design can be such that the injection piston 20 executes a short push motion, and thus takes over the function of an ejector.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus to actuate an injection element for pushing a defined quantity of material into an injection molding tool, the injection element comprising a piston or a screw that is guided and moved by an actuation element, the actuation element having a tappet, which is guided on a crank plate, the crank plate being turned with positional accuracy by a servomotor, the crank plate having a camming surface that causes an injection motion during which the injection element moves quickly to inject the material into the injection molding tool, the camming surface being shaped to thereafter cause the injection element to move more slowly as the camming surface continues to rotate to create a hold pressure on the material, the crank plate rotating 360° during an injection molding cycle.

2. The apparatus of claim 1, wherein, for the return stroke of the injection element, a second tappet is present, which is actuated by a second crank plate to return the piston or screw to a start position.

3. The apparatus of claim 1, wherein, for the return stroke of the injection element, a contour is formed into the crank plate, within which the tappet guided.

4. The apparatus of claim 1, wherein a contour is milled in the crank plate.

5. The apparatus of claim 1 which is implemented in a device for injecting a material into a molding tool, the device comprising:

a melting apparatus, in which the material is melted;

a metering apparatus which takes-up a controlled quantity of material;

a first fluidic connection between the melting apparatus and the metering apparatus;

a first element which prevents the material from backflowing in the first fluidic connection;

a second fluidic connection between the metering apparatus and the injection element; and a second element which prevents the material from flowing from the injection element back into the metering apparatus.

6. The apparatus of claim 1, wherein in a stroke of the piston or screw follows a predetermined trajectory that is determined by a profile of a camming surface of the crank plate.

7. The apparatus of claim 6, wherein the camming surface initiates a pull-back of the piston or screw after injection of the material into the molding tool.

8. The apparatus of claim 6, herein the camming surface comprises a contour providing for injection of the material followed by establishment of a hold pressure.

9. A plastic melt injection process, comprising:

introducing a quantity of plastic into a cylinder of an injection element;

pushing the plastic from the cylinder into the injection molding tool with a stroke of the injection element; and modulating the stroke of the injection element by rotating a crank plate having a camming surface that engages a tappet that is connected to the injection element, the camming surface causing an injection motion during which the injection element moves quickly to inject the plastic into the injection molding tool, the camming surface being shaped to thereafter cause the injection element to move more slowly as the canming surface continues to rotate to create a hold pressure on the plastic, the crank plate rotating 360° during the injection process.

10. The process described of claim 9, further comprising:

plasticizing the plastic; and metering the plasticized plastic into the cylinder.

11. The process described of claim 9, further comprising effecting a return stroke of the injection element by rotating a crank plate that engages a tappet that is connected to the injection element.

12. The apparatus of claim 1, wherein the camming surface allows the injection element a time period between the quicker and slower injection motions in which there is substantially no movement by the injection element.

13. The process as described in claim 9, further comprising providing a time period between the quicker and slower injection motions in which there is substantially no movement by the injection element.

* * * * *